(12) United States Patent
Hangleiter et al.

(10) Patent No.: US 9,387,539 B2
(45) Date of Patent: Jul. 12, 2016

(54) GRIPPER WITH EMERGENCY RELEASE

(71) Applicants: Eugen Hangleiter, Hermaringen (DE); Peter Schenk, Niederstotzinger (DE); Klaus Miller, Niederstotzinger (DE)

(72) Inventors: Eugen Hangleiter, Hermaringen (DE); Peter Schenk, Niederstotzinger (DE); Klaus Miller, Niederstotzinger (DE)

(73) Assignee: ROEHM GMBH, Sontheim (DE)

( * ) Notice: Subject to any disclaimer, the term of this patent is extended or adjusted under 35 U.S.C. 154(b) by 445 days.

(21) Appl. No.: 13/903,414

(22) Filed: May 28, 2013

(65) Prior Publication Data

US 2014/0001713 A1      Jan. 2, 2014

(30) Foreign Application Priority Data

Jun. 29, 2012   (DE) .......................... 10 2012 105 759

(51) Int. Cl.
| | |
|---|---|
| B23B 31/06 | (2006.01) |
| B23B 31/30 | (2006.01) |
| B23B 31/16 | (2006.01) |
| B23B 31/26 | (2006.01) |
| B23Q 3/06 | (2006.01) |
| B23B 31/20 | (2006.01) |
| B23B 31/28 | (2006.01) |

(52) U.S. Cl.
CPC ........... *B23B 31/06* (2013.01); *B23B 31/16287* (2013.01); *B23B 31/201* (2013.01); *B23B 31/265* (2013.01); *B23B 31/28* (2013.01); *B23B 31/30* (2013.01); *B23Q 3/067* (2013.01); *B23B 2270/09* (2013.01); *Y10T 279/1241* (2015.01); *Y10T 279/1291* (2015.01); *Y10T 279/17411* (2015.01); *Y10T 279/17666* (2015.01); *Y10T 279/17675* (2015.01); *Y10T 409/309464* (2015.01)

(58) Field of Classification Search
CPC ................ B23B 31/06; B23B 31/1627; B23B 31/16287; B23B 31/201; B23B 31/265; Y10T 279/1291; Y10T 279/17666; Y10T 279/17675; Y10T 279/1913; Y10T 409/309464

See application file for complete search history.

(56) References Cited

U.S. PATENT DOCUMENTS

| | | | | |
|---|---|---|---|---|
| 4,148,246 A | * | 4/1979 | Johnson ................ | B23B 31/265 408/239 A |
| 4,720,221 A | * | 1/1988 | Yoshioka .............. | B23B 31/263 409/144 |
| 4,729,700 A | * | 3/1988 | Hertel ................... | B23B 31/265 409/144 |

(Continued)

FOREIGN PATENT DOCUMENTS

| | | | |
|---|---|---|---|
| DE | 3635910 A1 * | 6/1987 | ............ B23B 31/265 |
| DE | 3926480 A1 | 8/1989 | |
| DE | 10331423 A1 | 7/2003 | |

*Primary Examiner* — Eric A Gates
(74) *Attorney, Agent, or Firm* — Andrew Wilford

(57) ABSTRACT

A gripper for use in combination with a pin has a body having an axially open cavity in which the pin is engageable. Jaws in the cavity are radially displaceable between an inner holding position bearing radially inwardly on and gripping the pin and an outer release position in which the pin can be removed axially from the cavity. An actuating element in the body is engageable with the jaws and shiftable between end positions corresponding to the inner and outer positions of the jaws. An actuator connected to the actuating element can move it from one of the end positions into the other of the end positions. An externally accessible connecting or operating member on the chuck body is connected through an emergency release with the jaws for moving the jaws into the outer release position as the result of connection to or operation of the member.

15 Claims, 5 Drawing Sheets

(56) References Cited

U.S. PATENT DOCUMENTS

| | | | | |
|---|---|---|---|---|
| 4,758,122 A * | 7/1988 | Kubo | B23B 31/113 | 279/89 |
| 4,804,301 A * | 2/1989 | Hunt | B23B 31/1074 | 279/87 |
| 5,851,091 A * | 12/1998 | Klement | B23B 29/046 | 279/2.02 |
| 6,234,731 B1 * | 5/2001 | Sakamoto | B23B 31/261 | 409/144 |
| 6,799,767 B2 * | 10/2004 | Kuroda | B23B 31/16233 | 269/172 |
| 7,249,919 B2 * | 7/2007 | Dawidziak | B23B 31/265 | 408/239 R |
| 8,246,280 B2 | 8/2012 | Hangleiter | | |
| 8,297,893 B2 | 10/2012 | Hangleiter | | |
| 8,430,004 B2 * | 4/2013 | Reinauer | B23B 29/046 | 82/159 |
| 2009/0278323 A1 * | 11/2009 | Hangleiter | B23B 31/265 | 279/4.08 |

* cited by examiner

GRIPPER WITH EMERGENCY RELEASE

FIELD OF THE INVENTION

The present invention relates to a gripper. More particularly this invention concerns a tool chuck or pallet lock provided with an emergency release.

BACKGROUND OF THE INVENTION

A typical gripper usable as a tool chuck or pallet loc has a body holding an actuating element that can be moved by an electric actuator between a holding position and a release position so as to operate a segment collet having at least two collet jaws. These jaws can grip a pin forming the stem or shank of a tool or a pull-down bolt of a pallet.

In a pallet-locking system a plurality of these grippers interact with respective mounting bolts on the pallet and clamp them in place. One problem that can nevertheless arise here is that the pallet can no longer be removed from the locking system if there is a failure of the electric actuator for a single gripper. As a result, this type of failure often necessitates destroying the pallet in order to be able to separate it from the locking system and replace the defective actuated gripper.

The same problem also occurs when instead of the mounting bolt it is a tool that is gripped in a chuck. Here again the problem is that a failure of the electric actuator means that the tool can no longer be removed from the chuck. This then results in an increase in cost and possibly down times in production due to time-consuming maintenance work.

OBJECTS OF THE INVENTION

It is therefore an object of the present invention to provide an improved gripper with emergency release.

Another object is the provision of such an improved gripper that overcomes the above-given disadvantages, in particular that has an externally operable emergency release that can open the collet jaws and release the pallet bolt or tool shank.

Thus the gripper can reliably release a gripped object gripped in any operational state.

SUMMARY OF THE INVENTION

A gripper for use in combination with a pin has according to the invention a body extending along a body axis and having an axially open cavity in which the pin is engageable. Jaws in the cavity are spaced about the axis and radially displaceable between an inner holding position bearing radially inwardly on and gripping the pin and an outer release position in which the pin can be removed axially from the cavity. An actuating element in the body is engageable with the jaws and shiftable between end positions corresponding to the inner and outer positions of the jaws. An actuator connected to the actuating element can move it from one of the end positions into the other of the end positions. An externally accessible connecting or operating member on the chuck body is connected through an emergency release with the jaws for moving the jaws into the outer release position as the result of connection to or operation of the member.

Whereas previously if the actuated gripper was to be released, this could only be effected if the electric actuator opened the segment collet and it was not possible to open the segment collet whenever there was a failure of the electric actuator, with the system of this invention the segment collet can be opened independently of the electric actuator. This allows an object gripped in the gripper, such as, for example, a pull-down bolt of a pallet or a shank of a tool, to be easily is removed from the gripper even in the event the actuator fails.

An approach has furthermore been found advantageous whereby the actuating element can be moved from the holding position to the release position by the emergency release. The action of the emergency release on the actuating element enables the internal operation of the gripper to be utilized, thereby providing a simple release of the gripping segment collet. It is of course also conceivable according to the invention for the emergency release to for example break the segment collet, thereby moving it out of engagement with the gripped item.

It has furthermore been found advantageous for the emergency release that spreads the gripped segment collet to have a spindle drive that moves the actuating element. Use of a spindle drive, in particular, enables a high level of functional reliability to be ensured, and this enhances the functional reliability of the gripper according to the invention. According to the invention, mechanical or manual shifting of the normally electric actuator is also provided that to this end is accessible from the side opposite the actuating element.

It has furthermore been found especially advantageous for the spindle drive to be provided in the form of a nut that is axially movable by a spindle and that acts on the actuating element. This enhances the reliability of the emergency release since rotation of the spindle provides a very trouble-free axial movement of the nut in the chuck body so that the actuating element is moved axially from the holding position to the release position. This design of the spindle can furthermore also be utilized to precisely adjust the force acting on the actuating element.

It has furthermore been found advantageous for the spindle drive to be formed by a threaded ring that can rotate about the chuck axis so as to move a threaded member that acts like a spindle on the actuating element. When the threaded ring that according to the invention can also be located in the chuck body is rotated, the threaded member is shifted axially, thereby moving the actuating element from the holding position to the release position. The threaded member here can either be formed directly on the actuating element as one unit, or it can simply act indirectly on this element. Provision is furthermore made according to the invention whereby the threaded member is provided on the outer surface of at least one release bolt that is located in the chuck body.

It has furthermore been found extremely advantageous for the threaded member to be provided on the outer surface of a spindle ring that is located in the chuck body. The use of a spindle ring has a positive effect here on the transmission of force to the actuating element since the area acting on the actuating element is enlarged. Locating the spindle ring in the chuck body furthermore ensures that this body is not rotated when the threaded ring is adjusted and moved axially thereby. Provision is furthermore made according to the invention whereby the spindle ring is integrated into the actuating element, with the result that only the actuating element has to be located in the chuck body.

It has furthermore been found advantageous for an actuating member to be provided to move the spindle drive, which actuating member is preferably associated with the chuck body. If the electric actuator fails, the spindle drive can now be moved manually from the outside, thereby shifting the actuating element from the holding position to the release position. It is of course also possible according to the invention for the actuating member to be associated not with the chuck body but instead inserted in an opening provided in the chuck body so as to allow it to act on the spindle drive and thus move the actuating element from the holding position to the release position. Operation of the actuating member here can be effected in the conventional way, that is, it can be, for example, manually but also by an auxiliary actuator, where in this last-referenced implementation the torque applied can also be limited.

It has furthermore been found advantageous in terms of user-friendly operation for at least one bevel drive to be provided to connect the actuating member to the spindle drive. Using the bevel drive enables the force exerted on the actuating member to be very reliably transmitted to the spindle drive. Due to the redirection, the actuating member can furthermore be provided in a readily accessible position, which enhances the user-friendly operation of the gripper according to the invention. The invention furthermore provides that the coupling is between the actuating member and the spindle drive be implemented by other appropriate means.

It has furthermore been found advantageous for a pressurized-fluid connector to be provided that forms the actuating member and that is connected to a conduit through which a piston face of the actuating element, which functions as a piston and is held in a piston chamber, can be acted upon by a pressurized fluid. This pressurized fluid can be, for example, air, oil, or the like. Supplying this type of pressurized fluid through a central delivery line ensures that the emergency releasing is effected simultaneously for all currently operating grippers that are connected to this central delivery line.

It has been found especially advantageous for a collar of the actuating element to form the piston face. Using a large the piston face enables a greater force to act on the actuating element and this enhances the effectiveness of the emergency release. According to the invention, the collar can be either integrated into the actuating element or provided as a separate component.

It has also been found advantageous for the pressurized-fluid connector to be associated with the chuck body. This allows the pressurized fluid to be easily connected and to be employed quickly if the electric actuator fails. An approach is of course also possible according to the invention whereby the pressurized fluid is associated with the machine table and whereby the pressurized fluid can be introduced through appropriate delivery lines into the piston chamber that is provided in the chuck body.

It has been found especially advantageous for the axial position of the actuating element in the chuck body to be movable relative to the axial position of the electric actuator. As a result, the emergency release only has to move the actuating element, whereas the position of the electric actuator in the chuck body does not have to be moved. According to the invention, provision is also made whereby the actuating element and the electric actuator are permanently attached to each other, meaning that both the actuating element and the electric actuator are moved axially by the emergency release.

It has also been found advantageous according to the invention if the pressurized-fluid connector is associated with the pallet in a combination of at least one gripper and a pallet having a number of pull-in bolts that correspond to the number of grippers. The association of the pressurized-fluid connector with the pallet enables the supply line for the pressurized fluid to be easily attached, and this enhances the user-friendly operation of the combination according to the invention.

It has furthermore been found especially advantageous for the delivery of pressurized fluid into the piston chambers of a plurality of gripper to be effected through the respective pull-down bolts. As a result, the pressurized fluid can be introduced centrally into the pallet and is passed through the pull-in bolts into the respective piston chambers, thereby is axially moving the actuating elements of the respective grippers simultaneously.

BRIEF DESCRIPTION OF THE DRAWING

The above and other objects, features, and advantages will become more readily apparent from the following description, reference being made to the accompanying drawing in which.

DETAILED DESCRIPTION OF THE INVENTION

Figure 1:
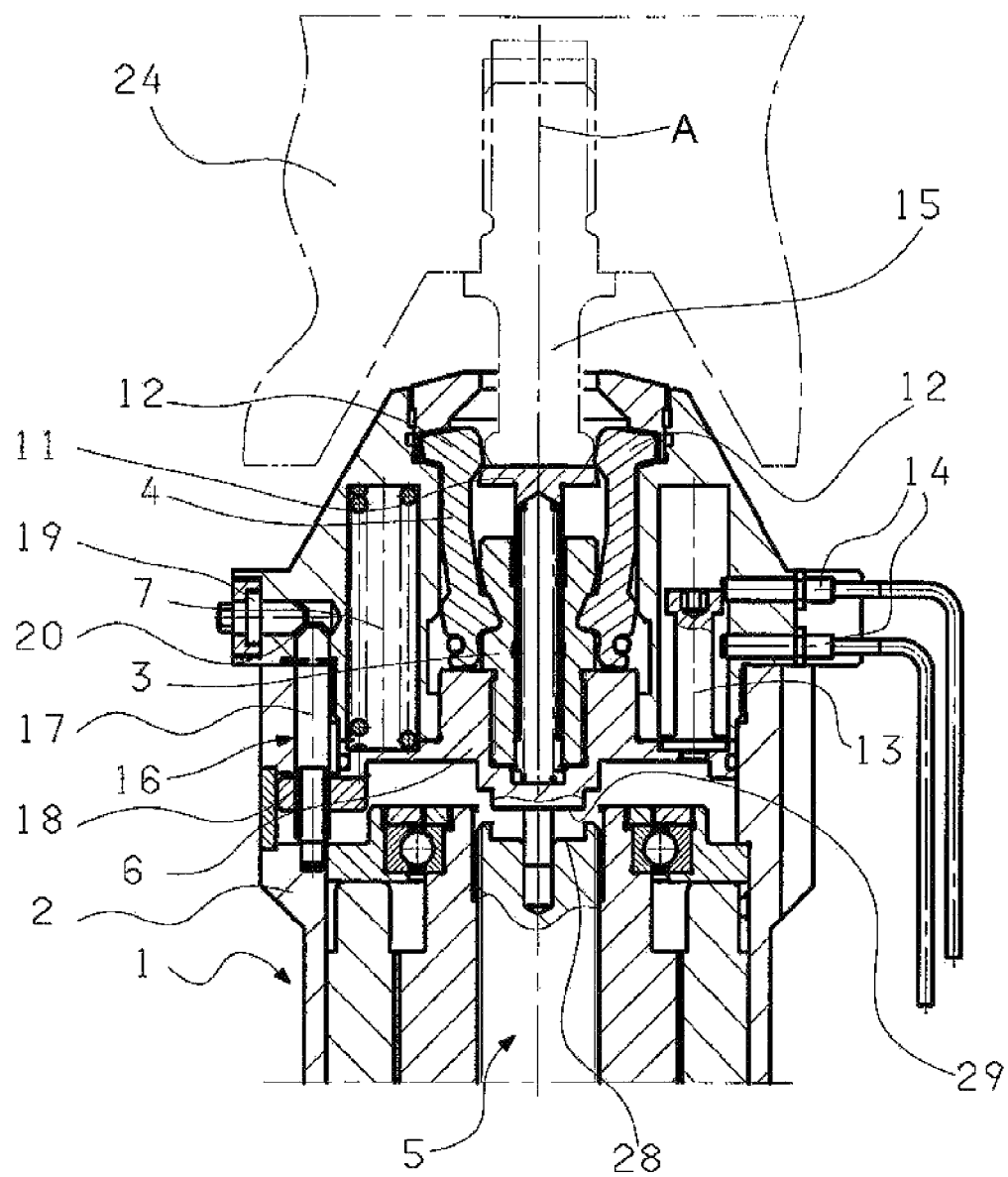
FIG. 1 is an section through a gripper having a nut as the emergency release.

As seen in FIG. 1, a first embodiment of the gripper 1 according to the invention has a body 2 holding an actuating element 3 that acts on a segment collet 4 received in a cavity centered on an axis A of the body 2. During normal operation, an electric actuator 5 moves the actuating element 3 axially forward from a holding position to a release position. To do this, a stop face 28 of the electric actuator 5 is pressed against a counter face 29 on a collar 6 projecting radially outward from the actuating element 3. As a result, the actuating element 3 is moved axially from the holding position to the release position. Jaws 12 that are actuated by the segment collet 4 are moved radially outward by a control cam on the actuating element 3, thereby releasing a previously gripped mounting bolt 15. This mounting bolt 15 is actively ejected here from the gripper 1 by a spring-mounted ejector 11 formed on the outer end of the actuating element 3. At the same time the ejector 11 pushes the jaws 12 radially outward into the release position and thus in a well-defined position, thereby facilitating reinsertion of the mounting bolt 15.

If the bolt 15 is now reinserted into the gripper 1, the spring-biased ejector 11 is thereby pushed axially toward the electric actuator 5. The stop face 28 has been moved axially rearward, that is, away from the ejector 11, by the electric actuator 5. Since springs 7 mounted in the gripper body 2 press axially on the collar 6 of the actuating element 2, this motion ensures that the counter face 29 of the collar 6 always remains in contact with the stop face 28. A position indicator 13 is associated with the collar 6 to detect the position of the actuating element 3, the position of this indicator 13 being detectable by two position sensors 14 connected to the gripper body 2.

If the electric actuator 5 fails in the gripping position, it is no longer possible to remove the gripped bolt 15 from the gripper 1. The result is that either the object carrying the gripped bolt 15 must be destroyed, or the gripper 1 must be laboriously disassembled so as to allow the release mechanism to be acted upon and thus enable the bolt 15 to be removed from the gripper 1. This means that the gripper body 2 must, for example, be sawed off in the region of the segment collet 4, or must be damaged somehow to allow the jaws 12 to be released from the segment collet 4.

To avoid this situation, an emergency release is provided in the gripper 1 shown in FIG. 1 that can be an actuated from outside in order to shift the gripper 1 from the holding position to the release position independently of the operational status of the electric actuator 5. In the embodiment shown in FIG. 1, this emergency release is a spindle drive 16 formed by a spindle 17 and a nut 18. The nut 18 acts here on the collar 6 that projects radially from the actuating element 3, thereby moving the actuating element 3 opposite to the force of the biasing spring 7 from the holding position to the release position.

The spindle drive 16 shown in FIG. 1 can be operated by an actuating member 19 that is carried in the gripper body 2. Movement of the actuating member 19 in the embodiment shown here is transmitted through a bevel drive 20 to the spindle 17 to rotate it. Due to the relative rotation of the spindle 17 and the nut 18 in the gripper body 2, the spindle 17 moves axially relative the actuating element 3, and thus moves axially relative to the electric actuator 5 from the holding position to the release position. The position of the actuating element 3 can be detected here by position sensors 14, thereby enabling a malfunction of the electric actuator 5 to be displayed, for example, by an optical signal, and additionally allowing the emergency release action to be interrupted after the emergency opening action has been successfully effected.

Figure 2:
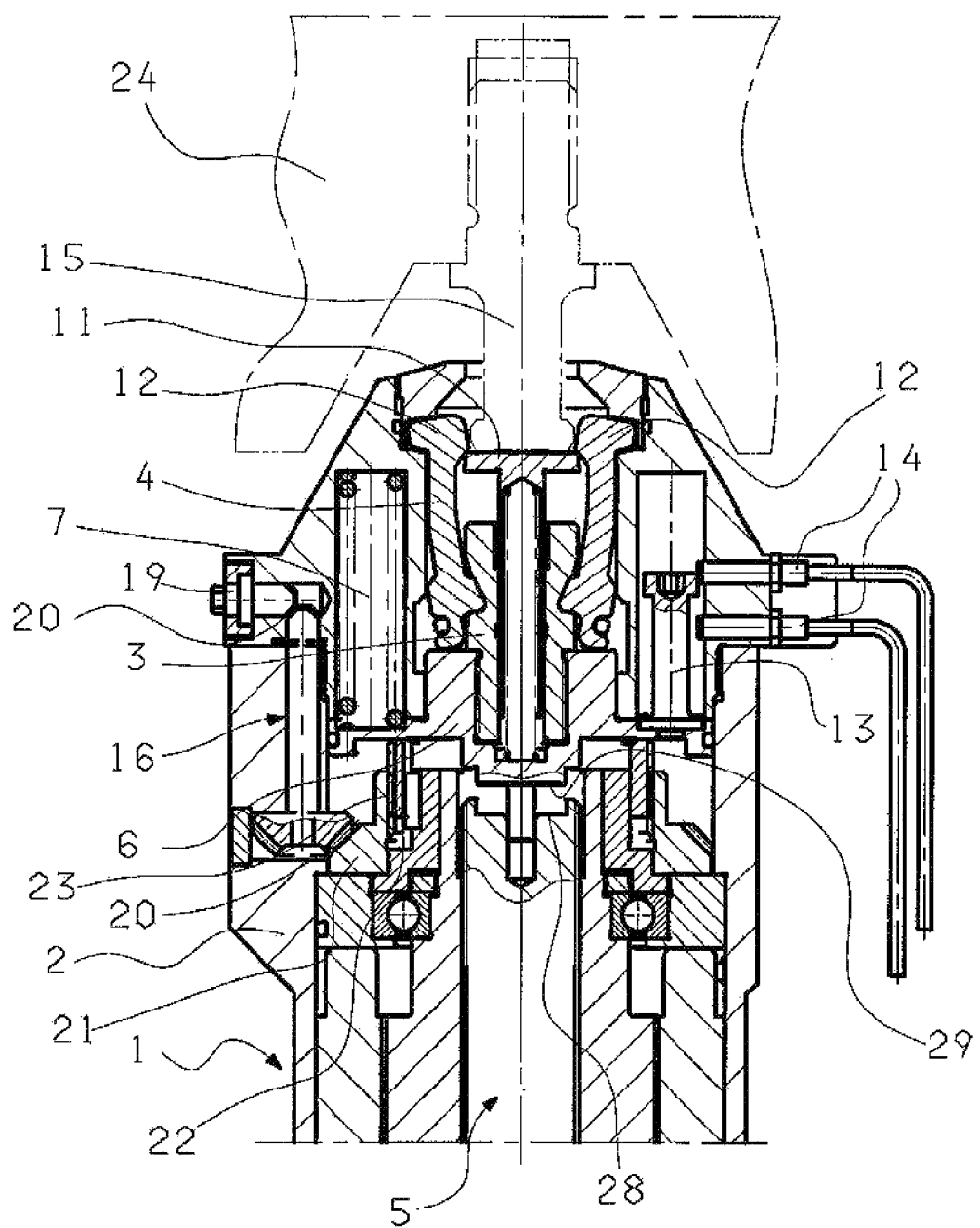
FIG. 2 is a section through a gripper having a threaded ring as the emergency release.

FIG. 2 shows another embodiment of the gripper 1 according to the invention. The emergency release here is also a spindle drive 16 that, however, is composed of a pair of threaded together rings 21 and 22. The ring 22 is in the gripper body 2 and is engaged by a screwthread 23 to the ring 21 that can be moved by the actuating member 19. When the threaded ring 21 is rotated by the actuating member 19, the ring 22 in the gripper body 2 rotates, thereby moving the actuating element 3 from the holding position to the release position. The actuating member 19 in the embodiment shown is coupled by two bevel gears 20 to the threaded ring 21 and thereby enables the spindle drive 16 to be actuated.

Figure 3:
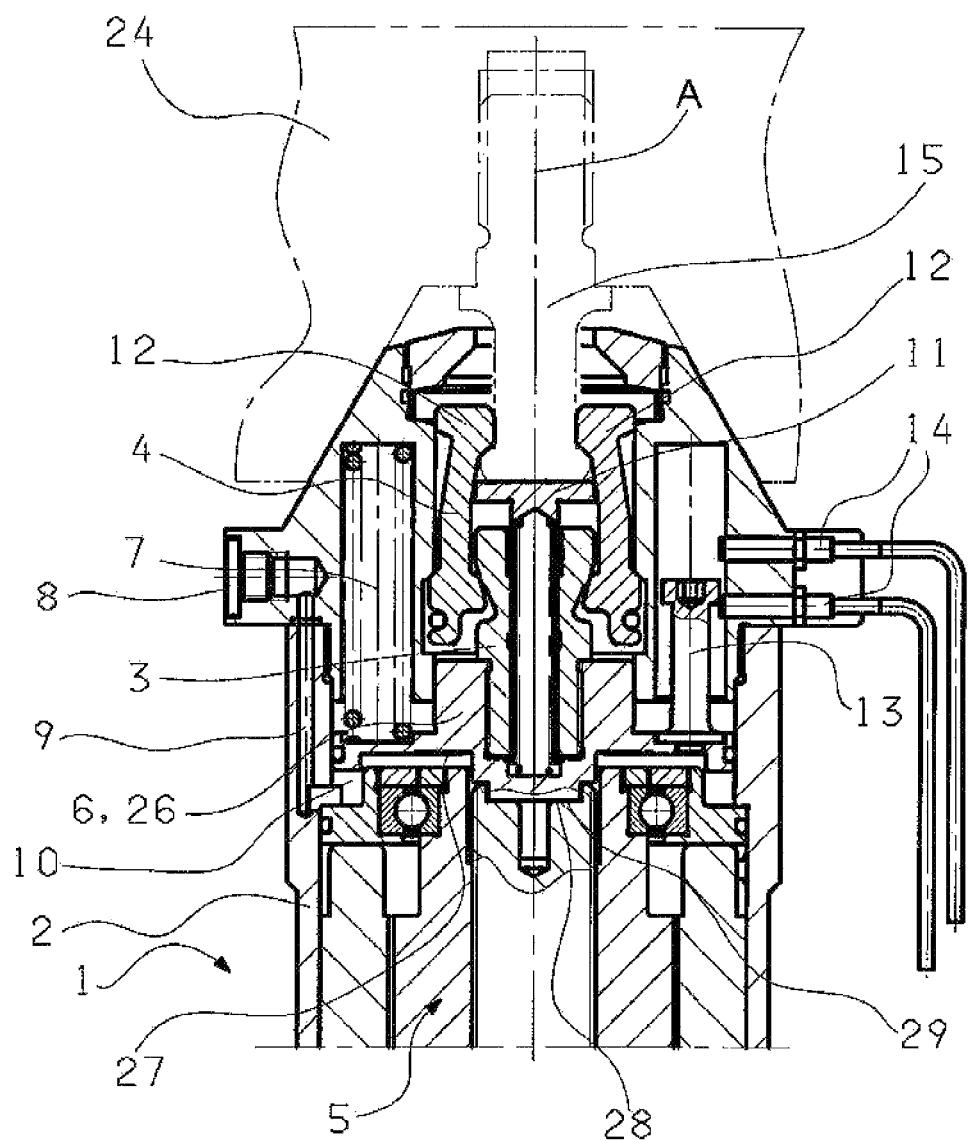
FIG. 3 is a section through a gripper in the holding position, having a pressurized-fluid connector supplying a pressurized fluid that functions as the emergency release.

FIG. 3 shows another embodiment of the gripper 1 according to the invention in the holding position. If the electric actuator 5 fails, a pressurized-fluid connector 8 in the embodiment shown is provided in the gripper body 2 that enables a pressurized fluid powering the emergency release to be supplied via a conduit 9 to a piston chamber 10 between the gripper body 2 and the actuating element 3 formed with the collar 6. The actuating element 3 thus functions here as a piston 26 having a piston face 27 formed in part by the collar.

Figure 4:
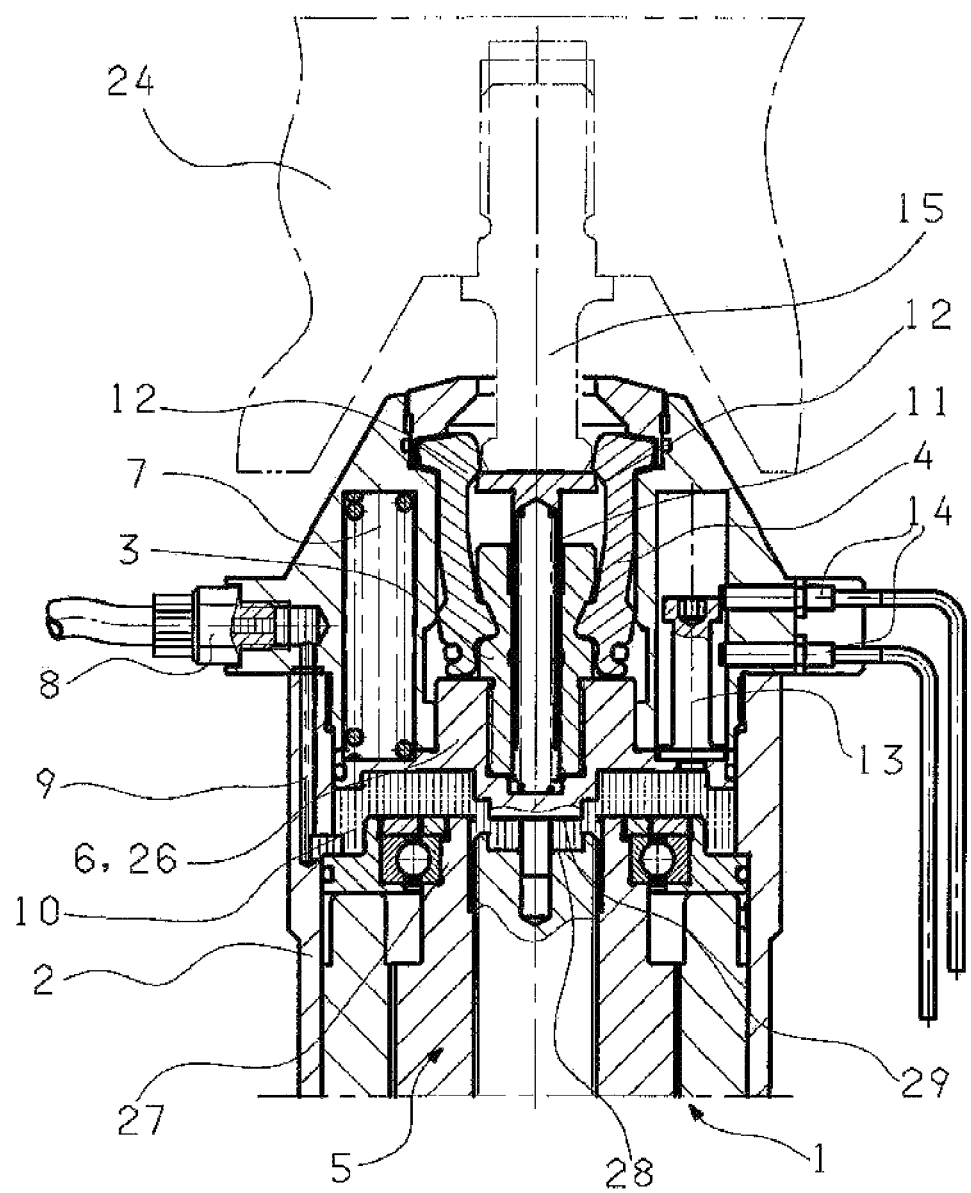
FIG. 4 is a section through the gripper of FIG. 3 in the release position.

FIG. 4 shows the gripper 1 of FIG. 3 but in the release position it is moved into by the pressurized fluid supplied to the pressurized-fluid connector 8. In order to be able to shift the actuating element 3 from the holding position to the release position and thus remove the stem 15 of a tool from the gripper 1 when the electric actuator 5 fails, pressurized fluid is introduced into the piston chamber 10 through the connector 8 on the gripper body 2. The pressurized fluid acts here on the piston face 27 in a direction opposite to that of the spring 7 and moves the actuating element 3, here the piston 26, axially relative to the electric actuator 5. As a result, the counter face 29 on the collar 6 of the actuating element 3 is moved away from the stop face 28 of the electric actuator 5.

Figure 5:
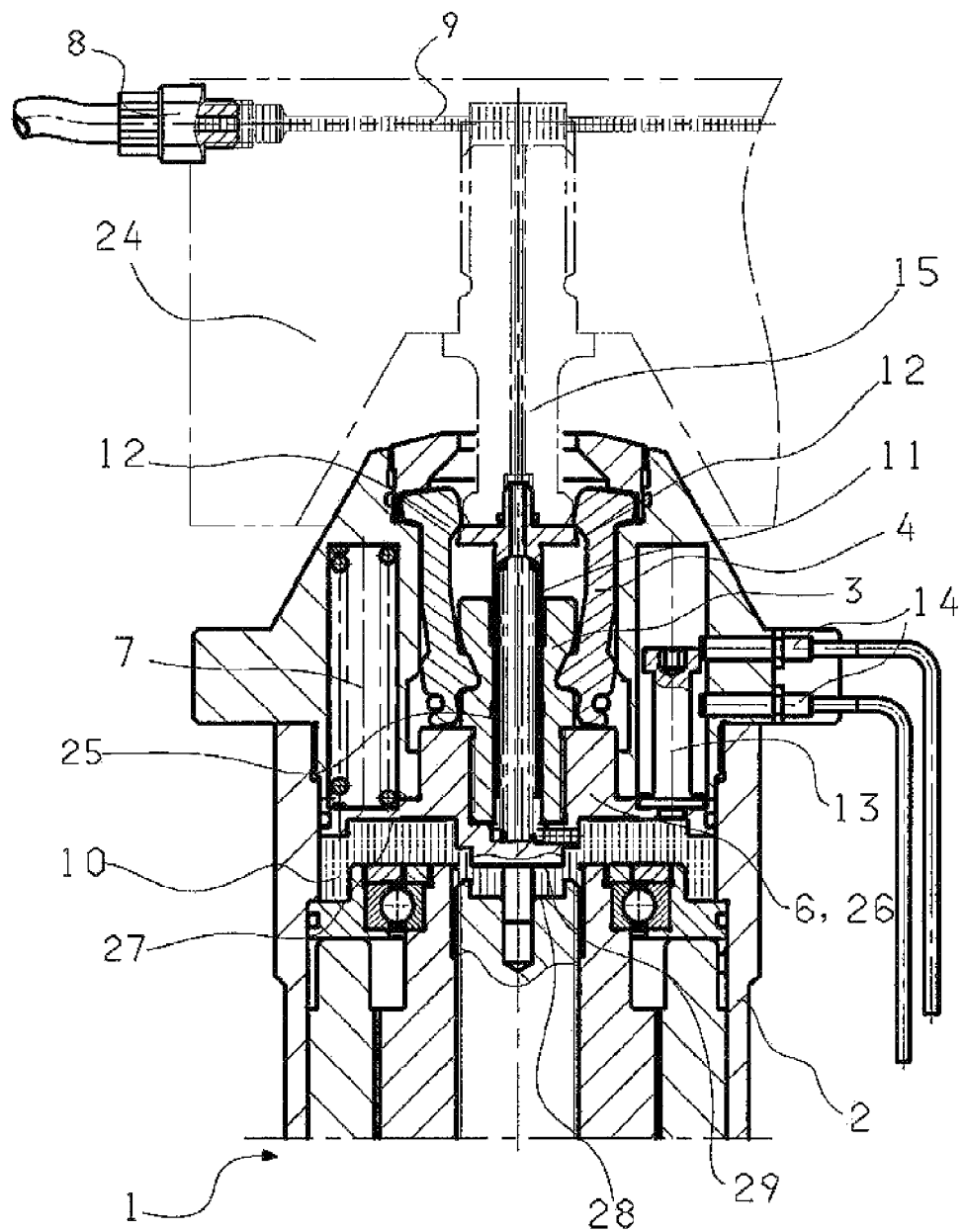
FIG. 5 is a section through a combination of a pallet and a gripper, having on the pallet a pressurized-fluid connector for supplying a pressurized fluid that operates the emergency releases of all the grippers locking down the pallet.

FIG. 5 shows a combination of the gripper 1 according to the invention and the bolt 15 carried on a pallet 24. The connector 8 is here on the pallet 24 and supplies a pressurized fluid functioning as the emergency release to the piston chamber 10 in the gripper body 2. A conduit or passage 25 for the pressurized fluid is provided here in the bolt 15. In addition, the ejector 11 and the actuating element 3 each also form part of the passage 25 that conducts pressurized fluid to the piston chamber 10. As a result, the pressurized fluid can be easily introduced into the pallet 24 through at a single central pressurized-fluid connector and then passes through appropriate conduits 9 provided on the pallet 24, into the individual grippers 1 and moves them all axially from the holding position to the release position. As a result, the emergency release can effect an emergency opening action on a plurality of grippers 1 through this central pressurized-fluid connector 8.

We claim:

1. A gripper for use in combination with a pin, the gripper comprising:
    a body extending along a body axis and having an axially open cavity in which the pin is engageable;
    jaws in the cavity, spaced about the axis, and radially displaceable between an inner holding position bearing radially inwardly on and gripping the pin and an outer release position in which the pin can be removed axially from the cavity;
    an actuating element in the body, engageable with the jaws, and shiftable between end positions corresponding to the inner and outer positions of the jaws;
    an actuator connected to the actuating element and energizeable to move it from one of the end positions into the other of the end positions;
    an externally accessible connecting or operating member on the chuck body; and
    an emergency release independent of the actuator, operable by the member, and directly connected to the actuating element for moving the jaws into the outer release position as the result of connection to or operation of the member.

2. The gripper defined in claim 1, wherein the member is directly connected to the jaws.

3. The gripper defined in claim 1, wherein the member is connected indirectly through the actuator to the jaws.

4. The gripper defined in claim 1, further comprising:
    a spring braced between the chuck body and the actuating element and biasing actuating element into the end position corresponding to the holding position of the jaws.

5. The gripper defined in claim 4, wherein the operating member includes an axially extending threaded spindle operatively engageable with the actuating element and rotatable to axially move the actuating element.

6. The gripper defined in claim 5, wherein the release includes a bevel drive having an input side exposed axially on the chuck body and an output side connected to the spindle.

7. The gripper defined in claim 1, wherein the emergency release includes a pair of threaded parts operatively engageable with the jaws.

8. The gripper defined in claim 7, wherein the parts are braced axially between the actuator and the actuating element and are threaded axially to each other, the member being connected to the parts to relatively rotate same and thereby, depending on the rotation direction, move them axially apart or together.

9. The gripper defined in claim 8, wherein the member is exposed radially on the chuck body and is rotatable about an axis extending radially of the body axis, the emergency release including a bevel drive connected between the member and one of the parts for converting rotation about the member axis of the member about the member axis into rotation of the one part about the body axis.

10. The gripper defined in claim 1, wherein the operating or connecting member is a pressurized-fluid connector, the emergency release including a piston forming with the chuck body a chamber and operatively connected to the actuating element and a conduit between the chamber and the connector such that pressurization of the chamber from the connector shifts the piston axially and moves the actuating element into the end position corresponding to the open position of the jaws.

11. The gripper defined in claim 10 wherein the actuating element is formed with a collar forming the piston.

12. The gripper defined in claim 10, wherein the passage is formed in the pin and in the actuating element, the connector being mounted on a pallet carrying the pin.

13. The gripper defined in claim 1, wherein the jaws are angularly equispaced in the cavity.

14. The gripper defined in claim 1, further comprising a spring engaging the jaws and urging the jaws into the outer position.

15. The gripper defined in claim 1, wherein the body and the cavity are centered on the body axis.

\* \* \* \* \*